United States Patent
Croker

(10) Patent No.: US 7,464,123 B2
(45) Date of Patent: Dec. 9, 2008

(54) BENCHMARK TESTING

(75) Inventor: Martin Croker, Tunbridge Wells (GB)

(73) Assignee: Accenture Global Services GmbH (CH)

( * ) Notice: Subject to any disclaimer, the term of this patent is extended or adjusted under 35 U.S.C. 154(b) by 450 days.

(21) Appl. No.: 10/477,660

(22) PCT Filed: May 14, 2002

(86) PCT No.: PCT/GB02/02241

§ 371 (c)(1),
(2), (4) Date: May 28, 2004

(87) PCT Pub. No.: WO02/093379

PCT Pub. Date: Nov. 21, 2002

(65) Prior Publication Data

US 2004/0199328 A1    Oct. 7, 2004

(30) Foreign Application Priority Data

May 15, 2001    (GB)    ................... 0111844.7

(51) Int. Cl.
G06F 12/00    (2006.01)
G06F 11/30    (2006.01)

(52) U.S. Cl. .................. 707/204; 707/202; 707/203; 707/186

(58) Field of Classification Search ................ 707/202; 702/108, 186; 709/224
See application file for complete search history.

(56) References Cited

U.S. PATENT DOCUMENTS

| | | | | |
|---|---|---|---|---|
| 5,021,997 A | | 6/1991 | Archie | 714/31 |
| 5,408,408 A | * | 4/1995 | Marsico, Jr. | 700/91 |
| 5,421,004 A | | 5/1995 | Carpenter et al. | 714/25 |
| 5,581,491 A | * | 12/1996 | Biwer et al. | 702/118 |
| 5,642,504 A | | 6/1997 | Shiga | |
| 5,701,471 A | * | 12/1997 | Subramanyam | 707/200 |
| 5,819,066 A | * | 10/1998 | Bromberg et al. | 707/102 |
| 5,953,689 A | * | 9/1999 | Hale et al. | 702/186 |
| 5,964,886 A | | 10/1999 | Slaughter et al. | 714/4 |
| 6,378,013 B1 | * | 4/2002 | Hanson | 710/100 |
| 6,424,999 B1 | * | 7/2002 | Arnon et al. | 709/208 |
| 6,446,120 B1 | * | 9/2002 | Dantressangle | 709/224 |
| 6,453,269 B1 | * | 9/2002 | Quernemoen | 702/186 |
| 6,718,446 B1 | * | 4/2004 | Peters et al. | 711/162 |
| 6,934,934 B1 | * | 8/2005 | Osborne et al. | 717/126 |
| 7,139,999 B2 | * | 11/2006 | Bowman-Amuah | 717/101 |
| 2002/0116152 A1 | * | 8/2002 | Tanaka | 702/186 |

FOREIGN PATENT DOCUMENTS

GB    2 357 170    6/2001

OTHER PUBLICATIONS

"EMC TimeFinder Product Description Guide," Aug. 19, 2000, pp. 1-32 Http://www.emc.com/products/product_pdfs/pdg/timefinder_pdg.pdf.

(Continued)

*Primary Examiner*—Luke S. Wassum
*Assistant Examiner*—Robert Timblin
(74) *Attorney, Agent, or Firm*—Fish & Richardson P.C.

(57) ABSTRACT

A method of benchmark testing, using test data, a component of a first computer system, using an additional computer system to restore said data.

30 Claims, 6 Drawing Sheets

OTHER PUBLICATIONS

Veritas Software Corporation, "Veritas Volume Manager Administrator's Reference Guide Release 3.0.1," May 1999, pp. 115-148.
International Search Report.

GB Search Report.
Examination Report dated Jan. 31, 2008, Canadian Patent Office.

* cited by examiner

BENCHMARK TESTING

FIELD OF THE INVENTION

The present invention relates to a method or apparatus for benchmark testing a component of a computer system. More particularly, but not exclusively, the present invention relates to a method or apparatus for benchmark testing a component of a computer system using multiple computer systems.

BACKGROUND TO THE INVENTION

Large computer systems, for example database systems, such as a server have a large data storage facility. A server comprises a processor, a memory, and a disc drive. The disc drive is able to store data and a computer program to operate devices attached to the server. The servers are connected to a network via a suitable connection. It is necessary for the components of the computer system to be regularly benchmark tested. The computer system is made up of hardware and software components, such as the memory devices, central processing units and the application processing algorithm (computer program). The benchmark test ensures the computer system's components are functioning correctly by testing their performance on a regular basis.

For each benchmark test cycle, a value of a parameter of a component within the computer system can be changed so that a comparative result is given. All parameter values, apart from the value of the parameter being tested, remain constant for each subsequent test cycle.

Computer systems, such as large settlement banking systems, execute benchmark tests as follows. Test data in a database is changed to an unsettled state, and a test using the data is executed which settles the trades. This settlement procedure is cycled as necessary. For each cycle a value of the parameter being tested can be changed. Measurements are taken to provide a value of, for example, the length of time it takes to complete each settlement procedure or the amount of memory used during the settlement procedure. The results of each run are compared with previous runs to ensure that the component of the computer system tested is operating correctly.

However, once an individual settlement procedure has been completed, the data in the database along with the control files and tablespace data files would have changed. It therefore becomes necessary to restore, or 'rollback', these parts of the database to a known state before a new settlement cycle can be executed. This provides a requirement for systems that can run benchmark tests on components of a computer system and concurrently restore the data and data files used in the test to a known state.

Typical server systems in use at present include the Sun E450™ and the Sun E10000™. Known data storage facilities include the Sun A5000™ product line of disc arrays.

Present benchmarking systems in use provide product specific dedicated storage devices attached to a server. The storage devices provide large volumes of storage space for temporary data storage. One such system is the EMC TimeFinder™ product, and works in the following manner.

The server's application environment is copied to a dedicated storage device, such as Symmetrix™. The application environment includes some of the database system files, such as the control files, the database tablespace files and the data. It is necessary to restore the application environment to a known state before each subsequent benchmark test. This enables benchmark testing of components of the computer system to be executed using the copied application environment. The benchmark test is executed under the control of the server, and therefore uses valuable server processing power during the test execution. Using this system, it is not possible to create a duplicate copy of the data whilst the benchmark test is being executed.

Such systems are very expensive due to the large array of product specific dedicated storage devices required.

STATEMENT OF THE INVENTION

According to a first aspect of the present invention, there is provided a method of benchmark testing, using test data, a component of a first computer system, using an additional computer system to restore said data.

According to a second aspect of the present invention there is provided an apparatus for benchmark testing, using test data, a component of a first computer system comprising a first computer system, and an additional computer system that restores said data.

Further objects and advantages will be apparent to the skilled reader from the following description and claims.

BRIEF DESCRIPTION OF THE DRAWINGS

Specific embodiments of the present invention will now be described by way of example only, with reference to the accompanying drawings, in which.

DESCRIPTION OF PREFERRED EMBODIMENT

Figure 1:
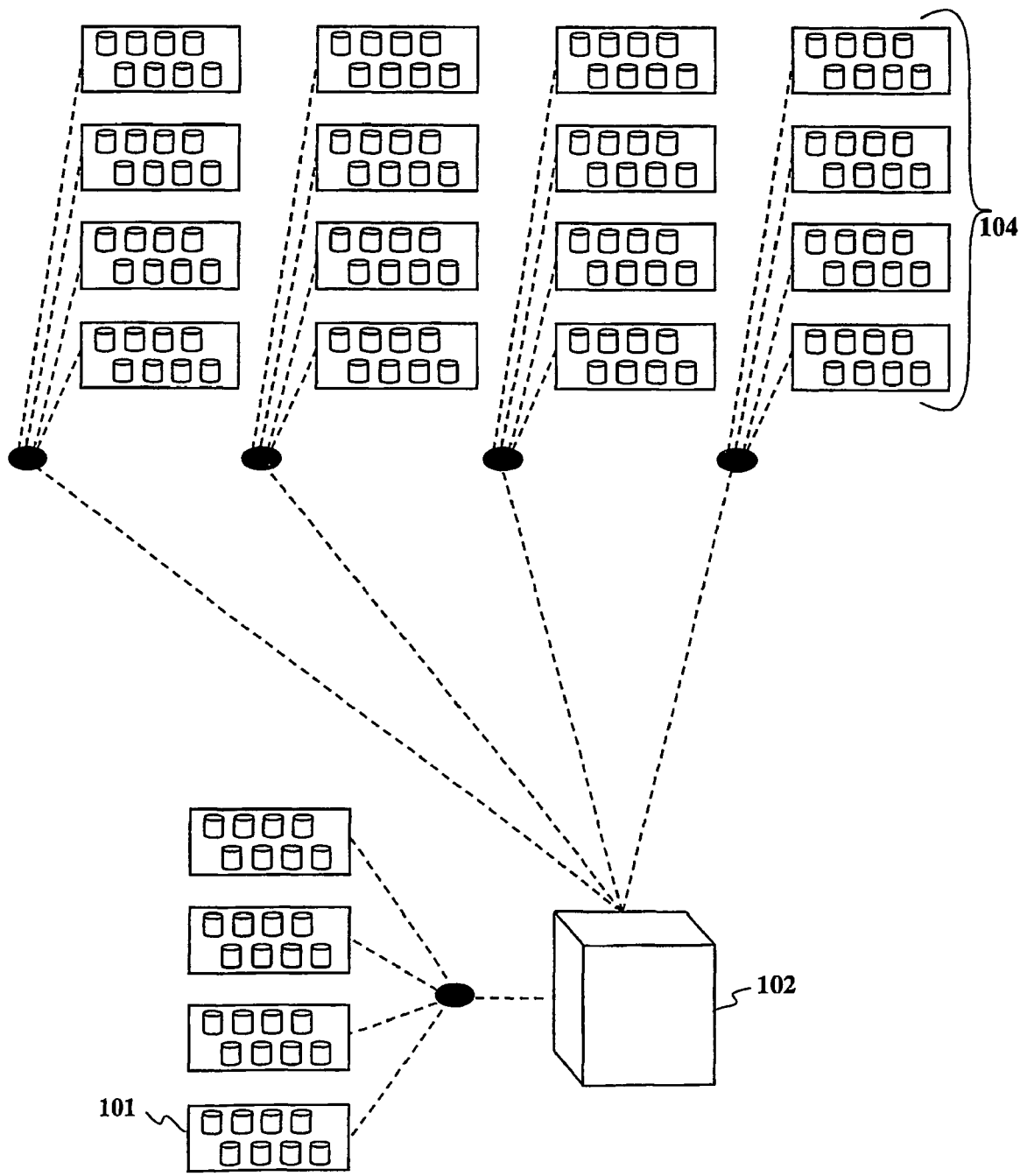
FIG. 1 shows a prior art system utilising dedicated storage discs.
Figure 2:
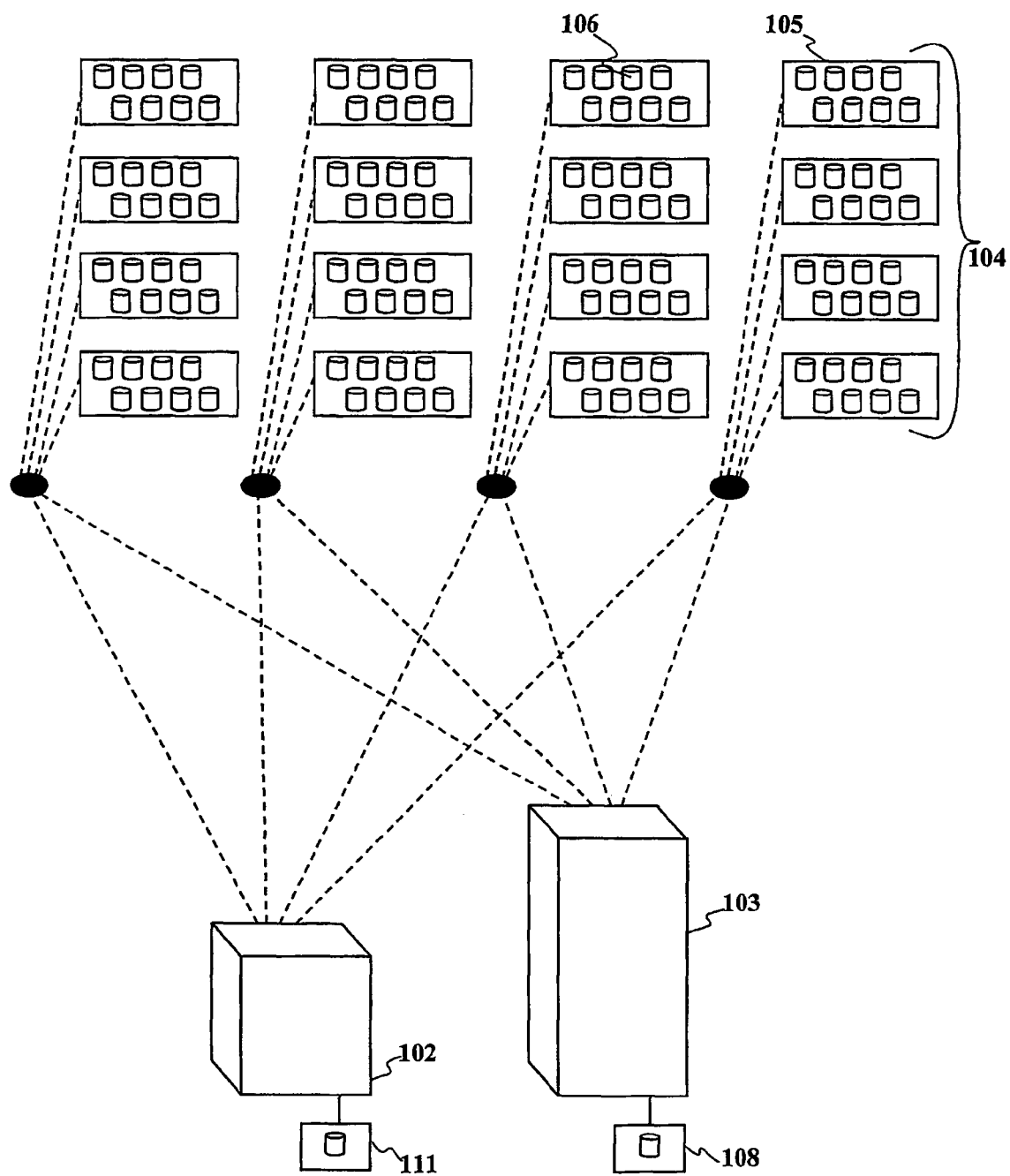
FIG. 2 shows how servers and discs may be interconnected according to an embodiment of the present invention.

Referring to FIG. 2, a benchmarking system is shown consisting of two servers (102, 103) which are connected, via fibre hubs, to an array of data storage devices (104) such as physical discs. Each server has it's own boot disc (108, 111) only accessible by that server. The physical discs (106) may be accessible by any number of servers connected to the storage network. A standard parallel connection interface, such as SCSI (Small Computer Systems Interface), is used to connect the servers to the array of discs. The host sees all the discs within the array as a SCSI target.

Figure 3:
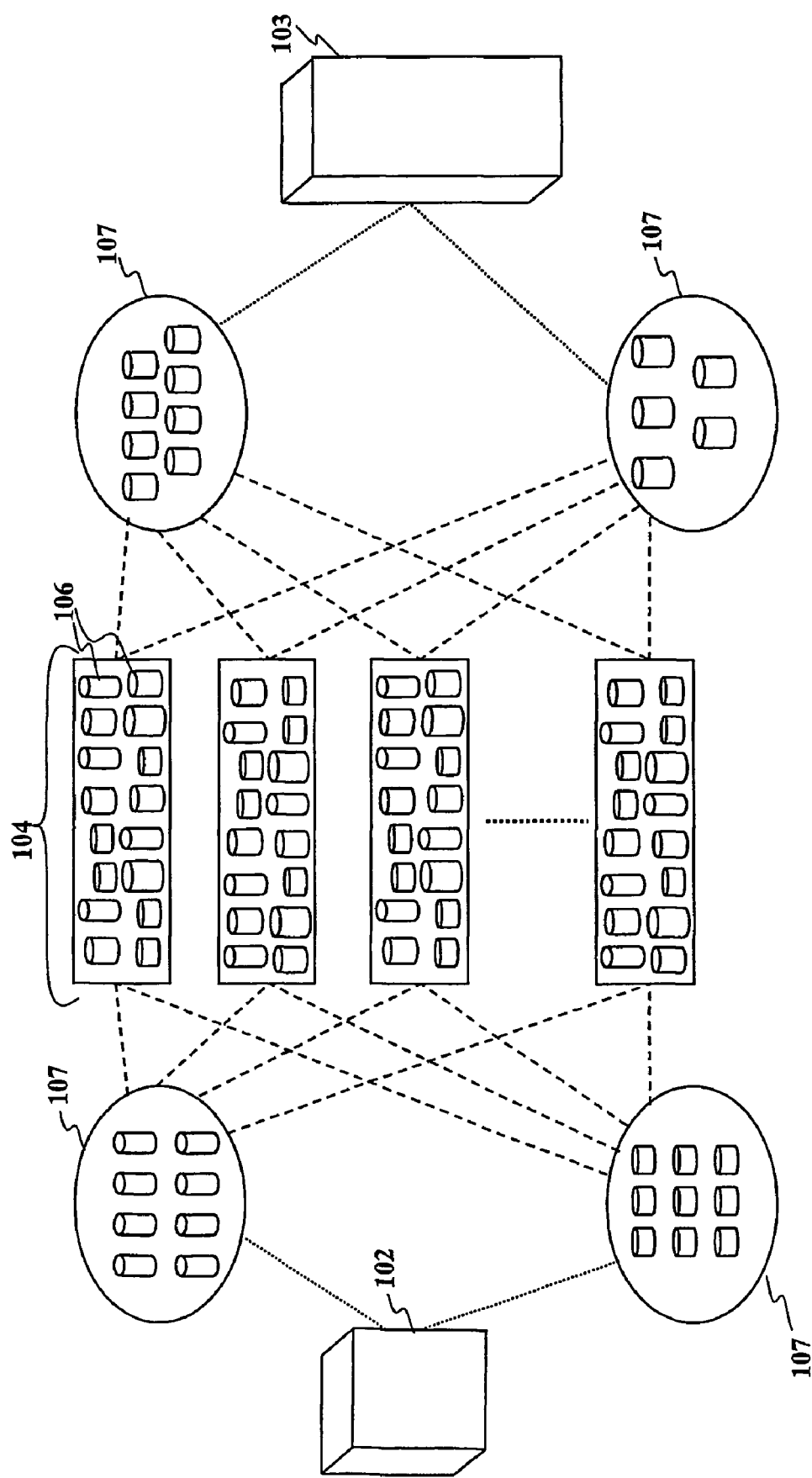
FIG. 3 shows the concept of disc groups according to an embodiment of the present invention.

As shown in FIG. 3, one or more physical discs (106) are combined to form disc groups. A disc group (107) may contain any number of physical discs across any number of storage arrays (105). A logical volume of data may be spread over one or more sections of one or more physical discs, allowing large volumes of data to be grouped together exceeding the boundary of a single physical disc. To control access to the storage devices, a logical volume manager, is loaded on to each server and is used to intercede between the applications and the physical discs. Such a volume manager could be Veritas™ volume manager, which is available from Veritas software Corporation, Veritas Park, Bittams Lane, Guildford Road, Chertsey, Surrey, KT16 9RG. The logical volume manager prevents two or more servers from utilising the same SCSI target, thus preventing the same disc groups being accessed by different servers at the same time.

The logical volume manager provides the ability for each server to import or export disc groups. A server is only able to access logical discs and file systems that reside in disc groups currently imported onto that server. Any of these disc groups, not currently attached to a server, may be imported by any server connected to the array of discs.

Figure 4:
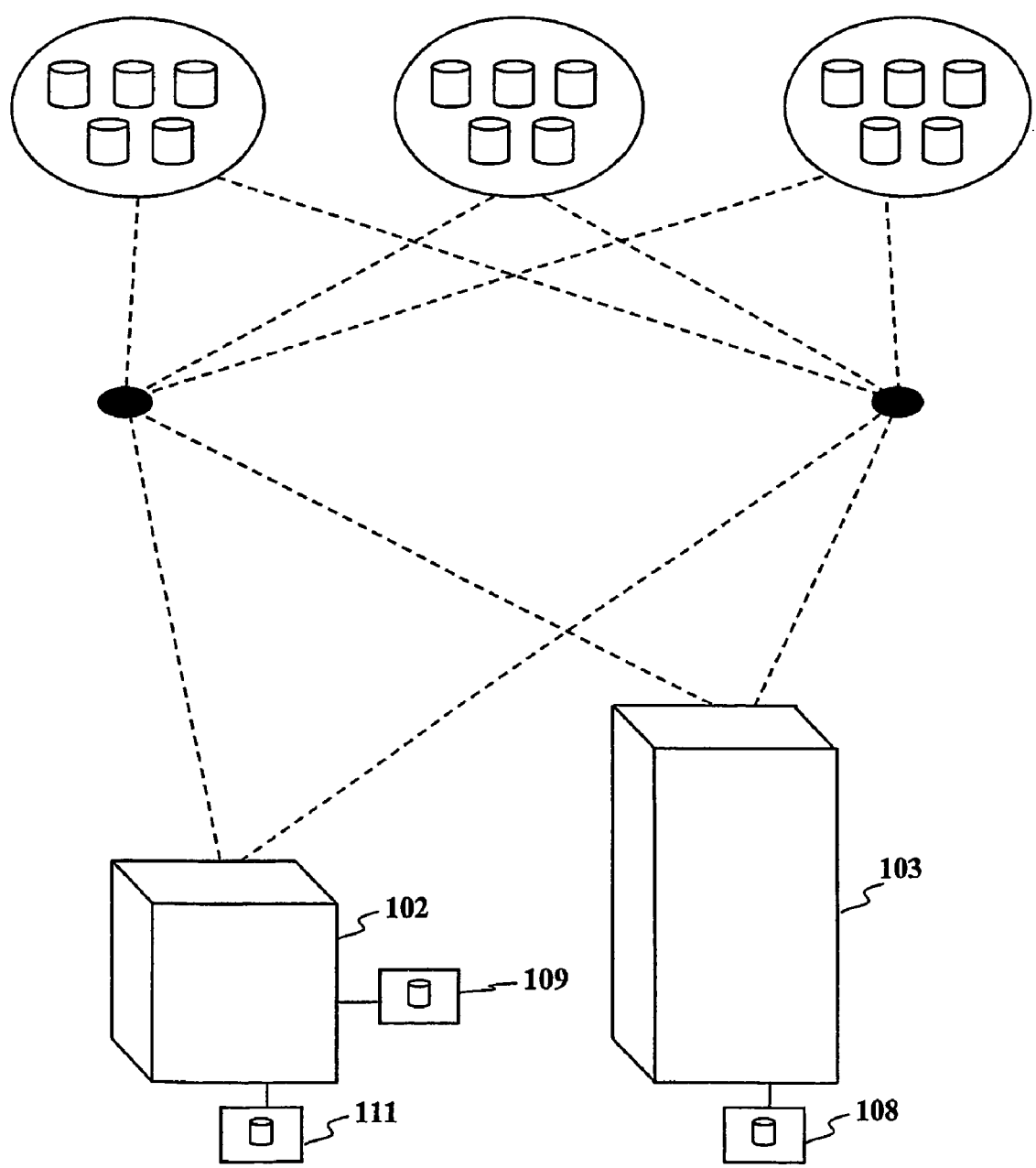
FIG. 4 shows the location of an application environment according to a preferred embodiment of the present invention.

Referring to FIG. 4, two servers (102, 103) are shown that have access to a number of disc groups. It will be apparent to the skilled man that more than two servers may have access to the disc groups. Access to these disc groups is controlled by the logical volume manager. A first computer system or server, the execution host (103), has access to any of the disc groups under control of the volume manager. An additional computer system or server, the copy host (102), has access to the master copy (109) of an application environment which includes database tablespace data files, control files and data, all of which are used as the test data during each benchmark test. The application environment in this embodiment is part of a database system, but could also be any system where restoration of data is required. The execution host executes the benchmark test using the data and files in the application environment.

FIG. 4 shows how the master copy (109) of the application environment can be created on local discs attached to the copy host. The data in the master copy (109) is not altered during the benchmark test procedure.

Both the copy host (102) and the execution host (103) have, loaded onto their respective systems, a benchmark tools suite consisting of a series of scripts. The scripts are a sequence of high level instructions used to control the volume manager. The benchmark tools suite provides the ability to import and deport logical volumes of data.

The benchmark tools suite uses the concept of a data set, and is comprised of logical volumes of data. A logical volume of data could, for example, consist of a single database. The benchmark tools suite controls a master disc group and any number of execution disc groups. The master disc group contains the master copy of the application environment i.e. the database tablespace data files, control files and data. The execution disc groups contain duplicate copies of the data set master.

The logical volume layout of the duplicate copies is determined by a configuration file in the benchmark tools suite and does not have to conform to the logical volume layout of the master copy, the layout of the duplicate copy determines the format of benchmark testing to be executed. A data set may at any time have zero or more execution disc groups assigned to it, and each execution disc group contains an execution copy upon which a benchmark test may be executed.

The execution host (103) has loaded on to its system the rest of the necessary files and data required to run the database. For example, the execution host (103) would have access to the application binaries, any third-party applications, application and performance logs, and any test input data. It is not necessary to restore any of these files and data to a known state for each subsequent benchmark test.

Referring to FIGS. 5a to 5e, an example is given of disc group management required to execute a benchmark test according to the present invention.

Figure 5A:
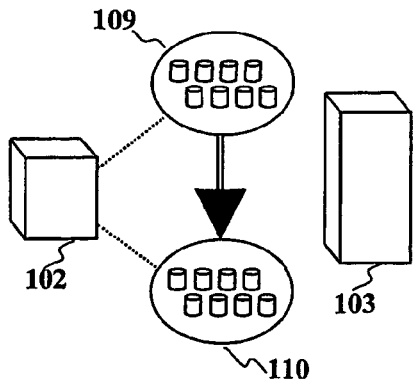
FIGS. 5a to 5e show how access to the disc groups is changed to execute a benchmark test as required by an embodiment of the present invention.

FIG. 5a shows the benchmark tools suite executing an instruction that will enable the copy host (102) to create a duplicate copy of the application environment master copy (109) in a first execution disk group (110). This is the first execution copy.

Figure 5B:
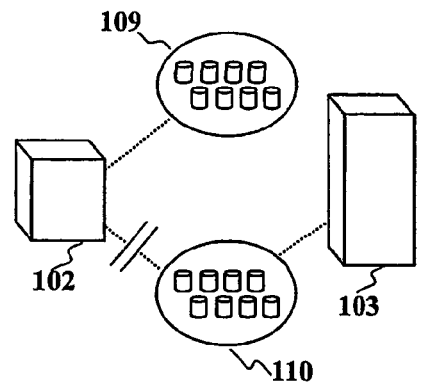

FIG. 5b shows how the benchmark tools suite controls the logical volume manager so that access to the first execution disc group (110) is switched from the copy host (102) to the execution host (103). The volume manager severs the link between the first execution disc group (110) and the copy host (102). A connection is then established between the execution host (103) and the first execution disc group (110). The execution host (103) now has access to the same execution disc group (110) as the copy host (102) previously did, i.e. the execution disc group containing the first execution copy.

Figure 5C:
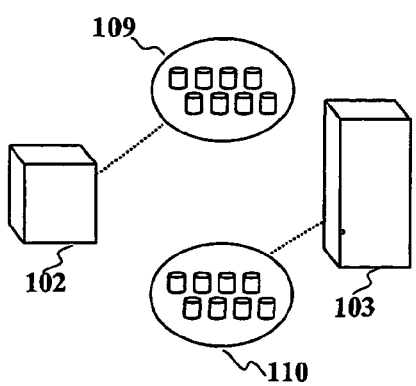

Referring to FIG. 5c, the benchmark tools suite enables the execution host (103) to execute a benchmark test using the application environment in the first execution copy.

The benchmark test can be used to test any of the components of the computer system running the test. All the parameter values of each component are kept constant during each benchmark test cycle, except the parameter value of the component been tested. The component being tested in this embodiment could also easily be, by way of example only, any of the following: the application processing algorithm (computer program), the amount of memory in the server, the CPU speed, the number of CPUs, or indeed any component of the computer system where a value of a parameter for that component can be changed for each subsequent benchmark test.

Once the benchmark test run has been completed, the result is sent to a further processing device, not discussed here. The result could be a timing calculation taken from the beginning of the test until the end of the test, or could easily be another parameter, such as memory usage, memory system leaks or indeed any other performance characteristic.

Once the execution host (103) has executed the benchmark test using the application environment in the first execution copy, the data and files of the application environment will have been changed by the benchmark test and therefore will be invalid for further tests. It is necessary to provide a new duplicate of the application environment if a further benchmark test is required. If no further benchmark testing is required, the logical volume manager allows any server to access the used disc group.

Figure 5D:
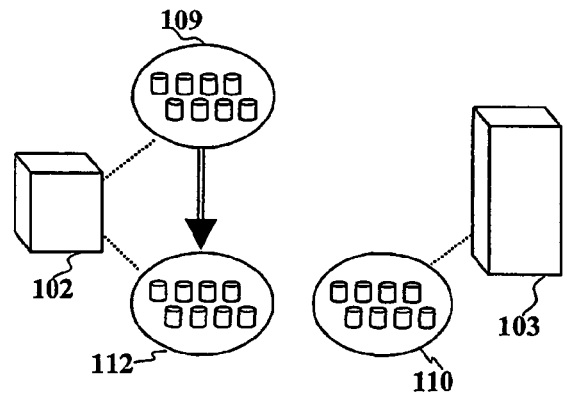

FIG. 5d refers to the case where continuous runs of benchmark tests are being executed. The copy host (102) creates a second duplicate copy of the master data within a second execution disc group (112), and is known as the second execution copy. The second duplicate copy is created after access to the first duplicated copy has been detached from the copy host (102).

Whilst the execution host (103) executes a benchmark test using the first execution copy within the first execution disc group (110), the second duplicate copy within the second execution disc group (112) may be created. Upon completion of the benchmark test using the first execution copy, access to the disc groups (110, 112) containing the first execution copy and the second execution copy are switched between the copy host (102) and the execution host (103). The volume manager switches access to the disc groups (110, 112) under control of the benchmark tools suite in the same manner stated above. The execution host (103) will then have access to a restored set of data upon which a new benchmark test may be run. The value of the parameter being tested may at this point be changed. However, it is also possible that a repeat run using the same value for the parameter being tested is required. The first execution disc group (112) in which the first execution copy was created is now accessible by the copy host (103).

Figure 5E:
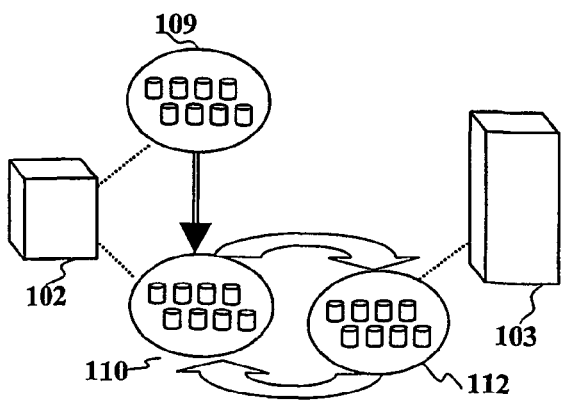

The copy host may, if required by the benchmark tools suite, create a further duplicate copy of the application environment from the master copy. The disc groups (110, 112) can now be cycled as many times as the benchmark system requires. A benchmark test is performed using one disc group, whilst the other disc group has a restored set of data written into it, as shown in FIG. 5e.

If a further benchmark test is to be executed and the desired logical layout of the execution copy changes, the previous used execution copy may be deleted and a new one created in the correct logical layout. The logical volume layout is arranged according to the configuration file in the benchmark tools suite.

Figure 6:
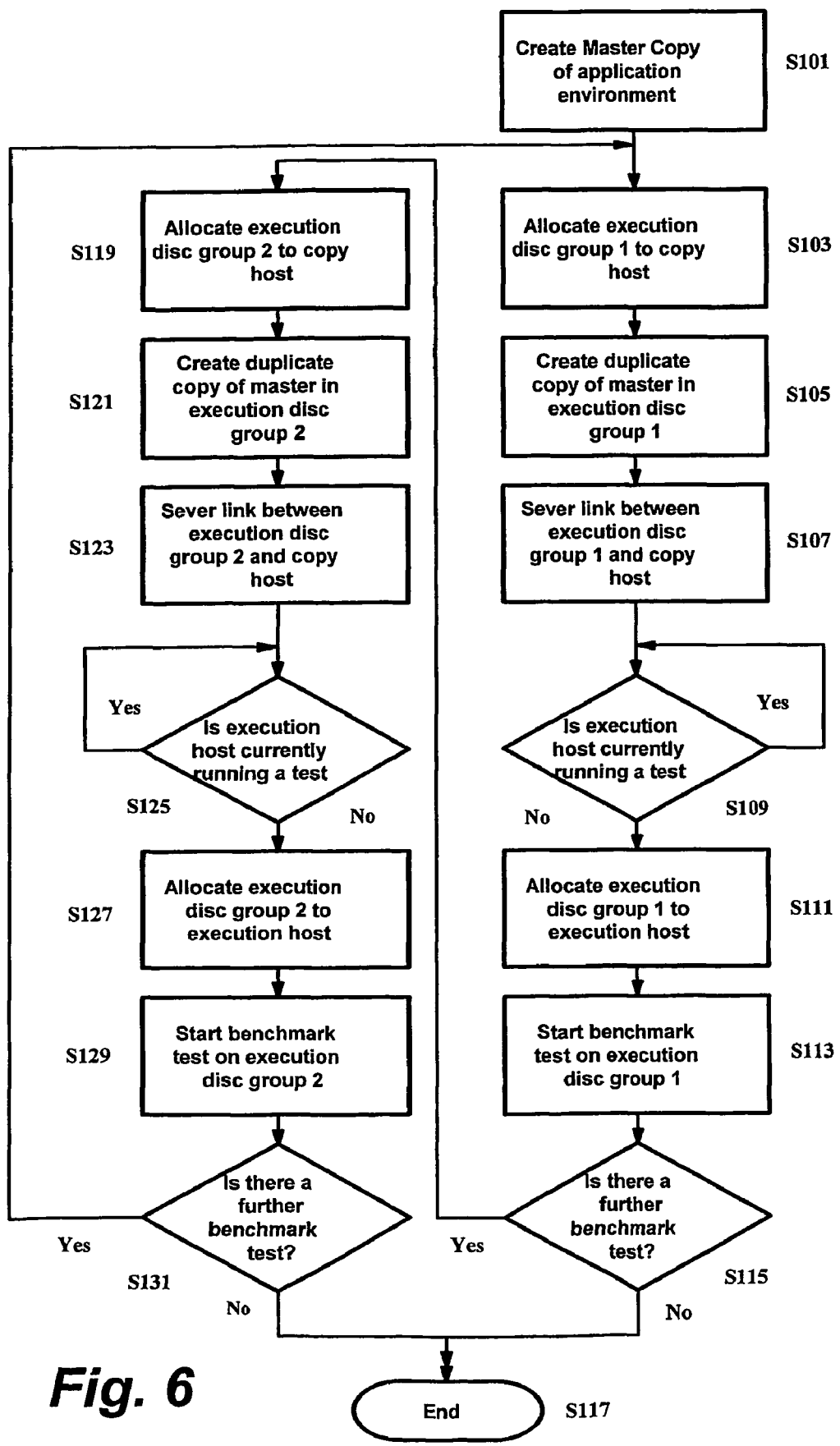
FIG. 6 shows a flow diagram of the method according to an embodiment of the present invention.

FIG. 6 shows a sequence of events according to one aspect of the present invention.

In step S101, a master copy of the application environment is created. In step S103, execution disc group 1 is allocated to the copy host. A duplicate copy of the master is then created in execution disc group 1, in step S105. The link between the copy host and execution disc group 1 is then severed in step S107.

In step S109, the system sits in a loop until the execution host has finished its previous test. Upon the completion of the test, execution disc group 1 is allocated to the execution host, as shown in step S111. The benchmark test can then be executed by the execution host using the data in execution disc group 1, as shown in step S113. If no further benchmark test is to be carried out in step S115, the task is completed (S117).

If a further benchmark test is required, a further execution disc group, execution disc group 2, is allocated to the copy host in step S119. In step S121, a duplicate copy of the master copy is created in execution disc group 2. The link between the copy host and the execution disc group 2 is then severed in step S123.

In step S125, the system remains in a loop until the execution host has completed its current test. Upon completion of the test, the execution disc group 2 is allocated to the execution host in step S127. The benchmark test can then be executed using the data in the execution disc group 2 by the execution host, as shown in step S129. This further benchmark test may run using a new value for the original parameter being tested, or may use the same value for the parameter being tested, or indeed may start testing a different parameter of a component in the computer system. If no further benchmark tests are to be executed in step S131, the task is completed (S117). If further tests are required, the process is repeated from step S103.

An execution disc group (110, 112) can be in one of the four following states:

Ready: the data in the disc group is a valid and correct copy of the master, and the disc group is ready to be used for execution. This disc group is not attached to any host.

Exec: the disc group is attached to the execution host, and databases and file systems may be started. Application execution may be in progress.

Dead: this disc group has previously been attached to the execution host, and the state of the data on the discs is unknown and is assumed to be dirty. This disc group is not attached to any host.

Prep: this disc group is attached to the copy host, and the data is currently being restored to a known state from the master disc group.

The benchmark tools suite comprises execution-host based tools, and copy-host based tools. The execution-host based tools are primarily concerned with readying the execution host prior to a test execution; and freeing the execution set, ready for copying back on to the copy-host. The copy-host based tools are concerned with attaching and detaching the execution set, and enable the transfer of data from the master volume to the execution set.

The copy-host based tools and execution-host based tools are best described by following the life cycle of a test execution set starting with a Dead test set.

A script bmautocopy is responsible for checking the disc storage to find execution sets that are ready for data to be copied in to them. This task is executed periodically by a standard UNIX utility "cron", as is well known within the art. When an appropriate disc set is found, bmautocopy invokes another script bmcopy against the discovered disc set. The script bmcopy will execute the utility script bmimportdg, which will import the disc group. The disc group will then be renamed to reflect the change of status from Dead to Prep.

Once the disc group has been successfully imported, bmcopy uses a configuration file to determine the stripe layout of the disc. This is then used to execute multiple streams of script bmcopystripe, allowing each stream to target distinct discs. For each volume that is passed to bmcopystripe, a check is made to see if the volume exists. If the volume does not exist, it is created as specified by the stripe set.

The volume data is copied from the master disc group to the execution set. It is not necessary for the volume on the master to be physically laid out in the same structure as the execution set as long as both logical volumes exist. The disc group is exported from the copy host and renamed Ready.

The two primary user interface scripts are bmprerun and bmpostrun. These scripts handle all operations required before and after test executions.

The script bmprerun imports Ready disc groups and renames them Exec. It also provides the capability to execute any databases residing on the execution set for the purposes of testing. Performance logging of the database is executed using a separate tool, which is not described herein. Performance logging of the UNIX host is executed by using a standard utility SAR, as is well known in the art. The bmprerun script also handles queue management, allowing the possibility of scheduling multiple runs. It is also possible for bmprerun to put the job on hold until a suitable data set has been imported and made Ready.

After execution of the benchmark test, the script bmpostrun is used to stop performance logging tools and shutdown any databases. The Exec group is detached and renamed Dead.

Each execution disc group will be provided with a name. The disc group name is created by concatenating the data set name and the disc group's state. For example, if the data set name is Project and the disc group contains a clean copy of the master, the execution disc group name would be ProjectReady.

It will be apparent to the skilled reader that various modifications and variations may be employed in relation to the above-described embodiment without departing from the scope of the present invention.

It would of course be possible to have more than one execution host connected to the array of discs. Each execution host can run its own individual benchmark test. It would also be possible to have more than one copy host, although each copy host would need access to its own master copy. Multiple copy hosts would therefore be limited by the amount of disc space available.

Although the invention has been described specifically for use in benchmark testing a component of a database system, it will be apparent to the skilled reader that any component of a computer system where there is a requirement for data to be restored could be used to implement the invention.

It will also be apparent to the skilled reader that where a single disc is concurrently accessible by two servers any interface scheme, other than SCSI, may be used.

It will further be apparent to the skilled reader that the master copy of the software programs may alternatively be created in a mirrored logical disc group within the shared disc array connected to both hosts.

What is claimed is:

1. A method of benchmark testing using test data, the method comprising:
   creating master test data in master data storage accessible by an additional computer system, the master test data representing data on which benchmark testing is performed;
   creating, using the additional computer system, a first duplicate copy of the master test data in a first data storage accessible by a first computer system;
   executing, by the first computer system, a first benchmark test using the first duplicate copy of the master test data in the first data storage to identify a first performance characteristic of the first computer system in executing the first benchmark test using the first duplicate copy of the master test data, execution of the first benchmark test including accessing data from and writing data to the first data storage such that the first duplicate copy of the master test data is changed after completion of the first benchmark test;
   during execution of the first benchmark test by the first computer system, creating, using the additional computer system, a second duplicate copy of the master test data in a second data storage, the second data storage being different than the first data storage;
   detecting completion of the first benchmark test by the first computer system; and
   in response to detecting completion of the first benchmark test by the first computer system:
      making the second duplicate copy of the master test data in the second data storage accessible to the first computer system; and
      executing, by the first computer system, a second benchmark test using the second duplicate copy of the master test data in the second data storage to identify a second performance characteristic of the first computer system in executing the second benchmark test using the second duplicate copy of the master test data, executing of the second benchmark test including accessing data from and writing data to the second data storage such that the second duplicate copy of the master test data is changed after completion of the second benchmark test.

2. The method of claim 1, wherein the first computer system is a database system.

3. The method of claim 1, wherein the first and additional computer systems are servers.

4. The method of claim 1, wherein the first data storage is a first data storage device and the second data storage is a second data storage device that is different than the first data storage device, further comprising:
   prior to creating, using the additional computer system, the first duplicate copy of the master test data, establishing a connection between the additional computer system and the first data storage device; and
   after creating, using the additional computer system, the first duplicate copy of the master test data and prior to using the first computer system to execute the first benchmark test using the first duplicate copy of the master test data:
      disconnecting the additional computer system from the first data storage device; and
      establishing a connection between the first computer system and the first data storage device,
   wherein:
      creating, using the additional computer system, the first duplicate copy of the master test data in the first data storage includes sending the master test data to the first data storage device over the connection between the additional computer system and the first data storage device, and
      using the first computer system to execute a first benchmark test using the first duplicate copy of the master test data in the first data storage includes accessing data from and writing data to the first data storage device over the connection between the first computer system and the first data storage device.

5. The method of claim 4, further comprising:
   prior to creating, using the additional computer system, the second duplicate copy of the master test data, establishing a connection between the additional computer system and the second data storage device; and
   after creating, using the additional computer system, the second duplicate copy of the master test data and prior to using the first computer system to execute the second benchmark test using the second duplicate copy of the master test data, disconnecting the additional computer system from the second data storage device,
   wherein:
      creating, using the additional computer system, the second duplicate copy of the master test data in the second data storage includes sending the master test data to the second data storage device over the connection between the additional computer system and the second data storage device,
      making the second duplicate copy of the master test data in the second data storage accessible to the first computer system includes establishing a connection between the first computer system and the second data storage device, and
      using the first computer system to execute the second benchmark test using the second duplicate copy of the master test data in the second data storage includes accessing data from and writing data to the second data storage device over the connection between the first computer system and the second data storage device.

6. The method of claim 1, wherein the second benchmark test includes the same operations as the first benchmark test.

7. The method of claim 6, further comprising:
   subsequent to completion of the first benchmark test and prior to using the first computer system to execute the second benchmark test using the second duplicate copy of the master test data in the second data storage, modifying a parameter of the first computer system,
   wherein using the first computer system to execute the second benchmark test using the second duplicate copy of the master test data in the second data storage includes using the first computer system with the modified parameter to execute the second benchmark test.

8. The method of claim 7 wherein modifying the parameter of the first computer system includes modifying at least one of an amount of memory accessible to the first computer system, a central processing unit speed of the first computer system, and a number of central processing units operated by the first computer system.

9. The method of claim 1 wherein the first data storage is a first array of storage devices and the second data storage is a second array of storage devices.

10. The method of claim 9 wherein the storage devices are physical discs.

11. The method of claim 1 wherein the master data storage is not accessible by the first computer system such that the master test data in the master data storage is not changed based on execution, by the first computer system, of the first and second benchmark tests.

12. The method of claim 1 further comprising:
after creating, using the additional computer system, the first duplicate copy of the master test data in first data storage, switching access control of the first data storage from the additional computer system to the first computer system.

13. The method of claim 1 further comprising:
determining whether further benchmark tests are to be performed by the first computer system;
based on determining that further benchmark tests are not to be performed, allowing at least one computer system, other than the first computer system and the additional computer system, to access the first data storage; and
based on determining that further benchmark tests are to be performed, cycling access control of the first data storage and the second data storage between the additional computer system and the first computer system to support continuous runs of the further benchmark tests by the first computer system.

14. The method of claim 1 further comprising:
determining whether a third benchmark test is to be performed by the first computer system; and
based on determining that a third benchmark test is to be performed:
during execution of the second benchmark test by the first computer system, creating, using the additional computer system, a third duplicate copy of the master test data in the first data storage;
detecting completion of the second benchmark test by the first computer system; and
in response to detecting completion of the second benchmark test by the first computer system:
making the third duplicate copy of the master test data in the first data storage accessible to the first computer system; and
using the first computer system to execute a third benchmark test using the third duplicate copy of the master test data in the first data storage, execution of the third benchmark test including accessing data from and writing data to the first data storage such that the third duplicate copy of the master test data is changed after completion of the third benchmark test.

15. The method of claim 1 further comprising:
logging the first and second performance characteristics; and
diagnosing the first computer system based on the logged first and second performance characteristics.

16. The method of claim 1 wherein executing, by the first computer system, a first benchmark test using the first duplicate copy of the master test data in the first data storage to identify a first performance characteristic of the first computer system in executing the first benchmark test using the first duplicate copy of the master test data comprises executing, by the first computer system, a first benchmark test using the first duplicate copy of the master test data in the first data storage to identify at least one of a timing calculation taken from a beginning of the first benchmark test until an end of the first benchmark test, memory usage in executing the first benchmark test, and memory system leaks in executing the first benchmark test.

17. An apparatus for benchmark testing, the apparatus comprising a first computer system, an additional computer system, master data storage, a first data storage, and a second data storage,
wherein the additional computer system is configured to:
create master data in master data storage accessible by the additional computer system, the master test data representing data on which benchmark testing is performed;
create a first duplicate copy of the master test data in the first data storage accessible by the first computer system;
wherein the first computer system is configured to:
execute a first benchmark test using the first duplicate copy of the master test data in the first data storage to identify a first performance characteristic of the first computer system in executing the first benchmark test using the first duplicate copy of the master test data, execution of the first benchmark test including accessing data from and writing data to the first data storage such that the first duplicate copy of the master test data is changed after completion of the first benchmark test;
wherein the additional computer system is further configured to:
during execution of the first benchmark test by the first computer system, create, using the additional computer system, a second duplicate copy of the master test data in second data storage, the second data storage being different than the first data storage; and
wherein the first computer system is further configured to:
in response to detecting completion of the first benchmark test:
access the second duplicate copy of the master test data in the second data storage, and
execute a second benchmark test using the second duplicate copy of the master test data in the second data storage to identify a second performance characteristic of the first computer system in executing the second benchmark test using the second duplicate copy of the master test data, execution of the second benchmark test including accessing data from and writing data to the second data storage such that the second duplicate copy of the master test data is changed after completion of the second benchmark test.

18. The apparatus of claim 17, wherein a component of the first computer system is a database.

19. The apparatus of claim 17, wherein the first and additional computer systems are servers.

20. The apparatus of claim 17, wherein the first data storage is a first data storage device, further comprising a storage access control device configured to establish a connection between the additional computer system and the first data storage device and disconnect the additional computer system from the first data storage device.

21. The apparatus of claim 17, wherein the second benchmark test includes the same operations as the first benchmark test.

22. The apparatus of claim 21, wherein the first computer system is configured to:
subsequent to completion of the first benchmark test and prior to execution of the second benchmark test using the second duplicate copy of the master test data in the second data storage, modify a parameter of the first computer system, and execute the second benchmark test with the modified parameter.

23. The apparatus of claim 17 wherein the first data storage is a first array of storage devices and the second data storage is a second array of storage devices.

24. The apparatus of claim 23, wherein the storage devices are physical discs.

25. A computer program, stored on a computer-readable storage medium, for controlling at least two computer systems to perform a method of benchmark testing, the computer program including instructions for causing a computer to:

create master test data in master data storage accessible by an additional computer system, the master test data representing data on which benchmark testing is performed;

create, using the additional computer system, a first duplicate copy of the master test data in a first data storage accessible by a first computer system;

execute, by the first computer system, a first benchmark test using the first duplicate copy of the master test data in the first data storage to identify a first performance characteristic of the first computer system in executing the first benchmark test using the first duplicate copy of the master test data, execution of the first benchmark test including accessing data from and writing data to the first data storage such that the first duplicate copy of the master test data is changed after completion of the first benchmark test;

during execution of the first benchmark test by the first computer system, create, using the additional computer system, a second duplicate copy of the master test data in a second data storage, the second data storage being different than the first data storage;

detect completion of the first benchmark test by the first computer system; and in response to detecting completion of the first benchmark test by the first computer system:

make the second duplicate copy of the master test data in the second data storage accessible to the first computer system; and execute, by the first computer system, a second benchmark test using the second duplicate copy of the master test data in the second data storage to identify a second performance characteristic of the first computer system in executing the second benchmark test using the second duplicate copy of the master test data, execution of the second benchmark test including accessing data from and writing data to the second data storage such that the second duplicate copy of the master test data is changed after completion of the second benchmark test.

26. The computer program of claim 25, wherein the first computer system is a database system.

27. The computer program of claim 25, wherein the first and additional computer systems are servers.

28. The computer program of claim 25, wherein the first data storage is a first data storage device, the second data storage is a second data storage device that is different than the first data storage device, and the computer program further comprises instructions to cause a computer to:

prior to creating, using the additional computer system, the first duplicate copy of the master test data, establish a connection between the additional computer system and the first data storage device; and after creating, using the additional computer system, the first duplicate copy of the master test data and prior to using the first computer system to execute the first benchmark test using the first duplicate copy of the master test data:

disconnect the additional computer system from the first data storage device; and establish a connection between the first computer system and the first data storage device, wherein:

the instructions to cause a computer to create, using the additional computer system, the first duplicate copy of the master test data in the first data storage include instructions to cause a computer to send the master test data to the first data storage device over the connection between the additional computer system and the first data storage device, and the instructions to cause a computer to use the first computer system to execute the first benchmark test using the first duplicate copy of the master test data in the first data storage include instructions to cause a computer to access data from and write data to the first data storage device over the connection between the first computer system and the first data storage device.

29. The computer program of claim 28, wherein the computer program further comprises instructions to cause a computer to:

prior to creating, using the additional computer system, the second duplicate copy of the master test data, establish a connection between the additional computer system and the second data storage device; and after creating, using the additional computer system, the second duplicate copy of the master test data and prior to using the first computer system to execute the second benchmark test using the second duplicate copy of the master test data, disconnect the additional computer system from the second data storage device, wherein:

the instructions to cause a computer to create, using the additional computer system, the second duplicate copy of the master test data in the second data storage include instructions to cause a computer to send the master test data to the second data storage device over the connection between the additional computer system and the second data storage device, the instructions to cause a computer to make the second duplicate copy of the master test data in the second data storage accessible to the first computer system include instructions to cause a computer to establish a connection between the first computer system and the second data storage device, and the instructions to cause a computer to use the first computer system to execute the second benchmark test using the second duplicate copy of the master test data in the second data storage include instructions to cause a computer to access data from and write data to the second data storage device over the connection between the first computer system and the second data storage device.

30. The method of claim 1 wherein:

creating master test data in master data storage accessible by the additional computer system includes creating a master application environment in master data storage;

creating, using the additional computer system, the first duplicate copy of the master test data in first data storage includes creating, using the additional computer system, a first duplicate copy of the master application environment; and creating, using the additional computer system, the second duplicate copy of the master test data in second data storage includes creating, using the additional computer system, a second duplicate copy of the master application environment.

* * * * *